United States Patent [19]
Kanekal et al.

[11] Patent Number: 5,649,175
[45] Date of Patent: Jul. 15, 1997

[54] METHOD AND APPARATUS FOR ACQUIRING BUS TRANSACTION ADDRESS AND COMMAND INFORMATION WITH NO MORE THAN ZERO-HOLD-TIME AND WITH FAST DEVICE ACKNOWLEDGEMENT

[75] Inventors: Hemanth G. Kanekal, San Jose; Thomas C. Yip, Los Gatos, both of Calif.

[73] Assignee: Cirrus Logic, Inc., Fremont, Calif.

[21] Appl. No.: 513,375

[22] Filed: Aug. 10, 1995

[51] Int. Cl.[6] .................................................. G06F 13/38
[52] U.S. Cl. ........................ 395/551; 395/881; 395/309; 395/310
[58] Field of Search ............................. 395/309, 290, 395/298, 305, 878, 881, 550, 494, 551, 280, 310

[56] References Cited

U.S. PATENT DOCUMENTS

| | | | |
|---|---|---|---|
| 4,979,097 | 12/1990 | Triolo et al. | 395/250 |
| 5,261,058 | 11/1993 | Squires et al. | 395/821 |
| 5,504,913 | 4/1996 | Baden | 395/800 |
| 5,537,582 | 7/1996 | Draeger | 395/552 |
| 5,574,894 | 11/1996 | Iles et al. | 395/555 |
| 5,586,286 | 12/1996 | Santeler et al. | 395/881 |

Primary Examiner—Jack B. Harvey
Assistant Examiner—Ario Etienne
Attorney, Agent, or Firm—Frank D. Nguyen

[57] ABSTRACT

An apparatus and method for acquiring address and command information related to a synchronous bus transaction with at most zero hold-time over substantially the duration of the bus transaction. Due to state changes, bus transaction address and command information may become invalid over the duration of the bus transaction. A transparent latch circuit is used to make the information available as soon as the information is received and to acquire valid information related to the bus transaction before a rising clock edge of the next clock cycle following a bus transaction request. A synchronous flip-flop circuit is utilized simultaneously to capture alternate valid information related to a bus transaction having at most zero hold-time. The acquired valid information and the alternately acquired valid information ensure that stable and valid bus transaction information are available over substantially the duration of the transaction. Moreover, by decoding the information as soon as they are received (i.e., before the transparent latch circuit closes), a fast bus transaction acknowledgement signal can be generated.

22 Claims, 18 Drawing Sheets

METHOD AND APPARATUS FOR ACQUIRING BUS TRANSACTION ADDRESS AND COMMAND INFORMATION WITH NO MORE THAN ZERO-HOLD-TIME AND WITH FAST DEVICE ACKNOWLEDGEMENT

TECHNICAL FIELD

This invention relates generally to peripheral hardware controllers in computer systems, and more particularly to a controller coupled to the Peripheral Component Interconnect (PCI) Local Bus.

CROSS-REFERENCED APPLICATION

Application entitled "Method and Apparatus for Acquiring Bus Transaction Data Information with No More Than Zero-Hold Time", by Yip et al., filed Aug. 10, 1995, Ser. No. 08/513,374.

BACKGROUND ART

In the area of digital systems, the task of accommodating increasing bus traffic continues to pose a challenge. The primary bottle-neck in most bus transactions appears to be the system bus. The system bus is a bottle-neck primarily because many devices share the same bus and must contend for its resources.

The PCI bus is a high performance, 32-bit or 64-bit bus with multiplexed address and data lines which can accommodate multiple high performance peripherals. The PCI Bus supports burst modes in which a bus transaction may involve an address phase followed by one or more data phases in tandem with a command phase followed by one or more byte enable phases. As such, an external device may require the use of the bus for multiple clock cycles during a bus transaction which can exacerbate bottle-neck problems associated with a system bus. Reference is now made to FIG. 1 which illustrates an overview of a computer system that utilizes the PCI bus. In FIG. 1, computer system 100 comprises host CPU 101, host memory 102, peripheral hardware controller 103, and bridge device 105. Peripheral hardware controller 103 is coupled to host CPU 101 and host memory 102 through PCI bus 104. More particularly, peripheral hardware controller 103 provides an interface between PCI bus 104 and external devices such as disk drivers, display monitors, parallel data port, local area network, wide area network, or the like.

In general, host CPU 101 and external devices may take turns controlling PCI bus 104 in carrying out transactions such as read and write transactions. While a device which takes control of PCI bus 104 to initiate the transaction is known as a "bus master" device, a device at the other end of the transaction is known as a "bus target" (or "slave") device. Information that are involved in bus transactions between devices include data, address, commands, byte enables, and identification of bus master and bus target device.

While a bus may be synchronous or asynchronous, PCI bus is a synchronous bus. In other words, information flowing from the bus master device to the target device and vice versa are synchronized to a system clock such that a bus transaction must take place in an integral number of synchronized clock cycles. In carrying out bus transactions, bus protocols must be followed. These protocols consists mainly of bus mastership, requests for read or write transactions, and acknowledgment of such requests. PCI bus protocols can be found in "The PCI Local Bus Specification Rev 2.0", published by the PCI Special Interest Group, P.O. Box 14070, Portland, Oreg. 97214 and incorporated herein by reference.

Required tasks associated with synchronous PCI bus transactions such as address decoding, command decoding, and request acknowledgment must be generated based on the system clock. As a result, acknowledgement by a bus target takes more than one system clock cycle to generate following a bus transaction (read or write) request by a bus master. After a bus master requests a bus transaction requiring one clock cycle, an additional clock cycle may be required for address and command decoding. For example, a bus master may send a bus transaction request and related information (i.e., address and command) to a bus target during a first clock cycle, a bus target receives the information and performs the necessary tasks of address and command decoding during a second clock cycle. The bus target then generates an acknowledgement during a third clock cycle. The use of three clock cycles slows down the bus transaction as a result.

Another challenge presented by the PCI bus involves a requirement for zero nano-second hold time. To allow sufficient time for information related to a bus transaction (i.e., command, address, and data) to arrive at a destination, the "PCI Local Bus Specification" allows a set-up time, $t_{su}$, of up to 7 nano-seconds from the time a bus transaction signal indicating the start of an information phase (e.g., address, data, command, etc.) is asserted until the next clock cycle begins. Moreover, once bus transaction information is made available, the "PCI Bus Specification" allows zero nano-second hold-time, $t_h$, for a device to acquire bus transaction information until the beginning of a next clock cycle. The failure to meet the zero-hold time requirement may lead to the capturing of invalid bus transaction information since a different information phase may begin in the following clock cycle. In other words, the zero nano-second hold-time requires bus transaction information to be preserved during the clock cycle in which that particular bus transaction information is put on a system bus.

Referring now to FIG. 2 which is a timing diagram illustrating set-up time, $t_{su}$, and hold-time, $t_h$. In FIG. 2, during clock cycle 1, signal FRAME# is asserted indicating a bus transaction request and the start of an address and command phases. However, required processing time may cause signal FRAME# to be asserted approximately at a middle part of clock cycle 1. At this point, bus transaction information (i.e., address and command) is made available on a system bus. Bus transaction information is to be available by $t_{su}$ before the next rising clock edge. Once the transaction information is made available, more than zero nano-seconds is needed to properly acquire the bus transaction information. As a result, the zero nano-second hold-time requirement as currently imposed by the "PCI Local Bus Specification" is unresolved.

OBJECTS AND SUMMARY OF THE INVENTION

One object of the present invention is to capture synchronous bus transaction address and command information by a bus target with no more than zero hold-time following the bus transaction initiation from the bus master.

Another object of the present invention is to generate a synchronous bus transaction acknowledgement signal with minimum delay following a bus transaction request.

These and other objects are met by various aspects of the present invention, wherein briefly stated, one aspect is an apparatus for acquiring address and command information from a synchronous bus transaction which operates with no more than zero hold-time over a substantial duration of the synchronous bus transaction. A first signal synchronizer generates a synchronous enable signal by synchronizing a bus transaction request signal with a system clock signal. A transparent register circuit is coupled to a system bus and the first signal generating means. The transparent register means is responsive to a predetermined logic state of the synchronous enable signal for immediately making available and acquiring valid information associated with the bus transaction information. A synchronous register circuit is coupled to the system bus. The synchronous register circuit is responsive to a predetermined edge of the system clock signal and the synchronous enable signal for alternately acquiring valid information associated with the bus transaction information. A multiplexer is coupled to the transparent latching circuit and the synchronous flip-flop circuit. The multiplexer selects between the acquired valid address and command information from the transparent latching circuit and the alternately acquired valid address and command information from the synchronous flip flop circuit as an output.

Another aspect of the present invention is an apparatus for generating a bus transaction acknowledgement following a bus transaction request with minimum delay. In addition to all the hardware elements recited by the apparatus for acquiring synchronous bus transaction information having at most zero hold-time, the apparatus for generating a bus transaction acknowledgement further includes: a decoder coupled to the multiplexer for determining whether the output of the multiplexer contains valid information, the decoding means generates a status signal; and a second signal synchronizer coupled to the decoder for receiving the status signal, the second signal synchronizer generates a bus transaction acknowledgement signal by synchronizing the system clock signal with the bus transaction request signal.

Another aspect of the present invention is a computer system including a host processor, a system memory, a system bus coupling the host processor to the system memory, and a peripheral hardware controller interposed between the system bus and external devices. The peripheral hardware controller further includes an apparatus for acquiring address and command information from a synchronous bus transaction which operates with no more than zero hold-time over a substantial duration of the synchronous bus transaction. A first signal synchronizer generates a synchronous enable signal by synchronizing a bus transaction request signal with a system clock signal. A transparent register circuit is coupled to a system bus and the first signal generating means. The transparent register means is responsive to a predetermined logic state of the synchronous enable signal for immediately making available and acquiring valid information associated with the bus transaction information. A synchronous register circuit is coupled to the system bus. The synchronous register circuit is responsive to a predetermined edge of a system clock signal and the synchronous enable signal for alternately acquiring valid information associated with the bus transaction information. A multiplexer is coupled to the transparent latching circuit and the synchronous flip-flop circuit. The multiplexer selects between acquired valid address and command information from the transparent latching circuit and the alternately acquired valid address and command information from the synchronous flip flop circuit as an output.

Preferably, the apparatus for acquiring address and command information from a synchronous bus transaction further possesses the capability to generate a bus transaction acknowledgement following a bus transaction request with minimum delay. Hence, in addition to all the hardware elements recited by the apparatus for acquiring synchronous bus transaction information having at most zero hold-time, the apparatus for generating a bus transaction acknowledgement further includes: a decoder coupled to the multiplexer for determining whether the output of the multiplexer contains valid information, the decoding means generates a status signal; and a second signal synchronizer coupled to the decoder for receiving the status signal, the second signal synchronizer generates a bus transaction acknowledgement signal by synchronizing the system clock signal with the bus transaction request signal.

Another aspect of the present invention is a method for acquiring address and command information from a synchronous bus transaction which operates with no more than zero hold-time over a substantial duration of the bus transaction. A bus transaction request is synchronized with a system clock signal to produce an enable signal. Valid address and command information provided by the bus transaction is acquired in response to a predetermined logic state of said enable signal. Alternate valid address and command information provided by the bus transaction information is acquired in response to a predetermined edge of said system clock signal. The acquired valid address and command information and alternately acquired valid address and command information is selected as an output.

Still another aspect of the present invention is a method for generating a fast bus transaction acknowledgement signal following a bus transaction request. A bus transaction request is synchronized with a system clock signal to produce an enable signal. Valid address and command information provided by the bus transaction is acquired in response to a predetermined logic state of said enable signal. Alternate valid address and command information provided by the bus transaction information is immediately made available and acquired in response to a predetermined edge of said system clock signal. The acquired valid address and command information and alternately acquired valid address and command information is selected as an output. The acquired valid information and alternately acquired valid information is selected as an output. The output signal is decoded to determine whether output signal is valid. The bus transaction acknowledgement signal is generated if the output signal is valid.

All the features, with their advantages of the present invention will become apparent from the following detailed description of its preferred embodiment, which description should be taken in conjunction with the accompanying drawings.

BRIEF DESCRIPTIONS OF THE DRAWINGS

DETAILED DESCRIPTION OF THE INVENTION

Figure 1:
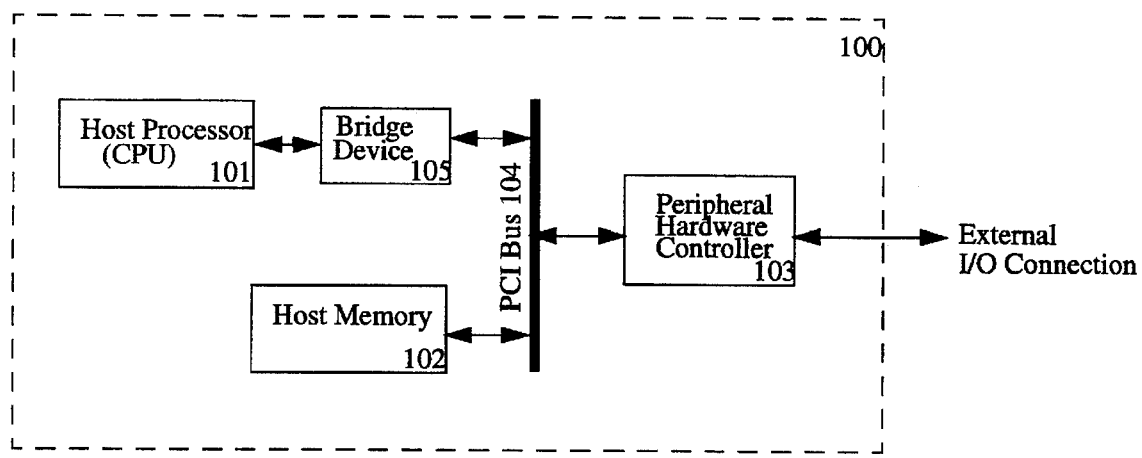
FIG. 1 is a block diagram of a computer system including a PCI local bus.
Figure 2:
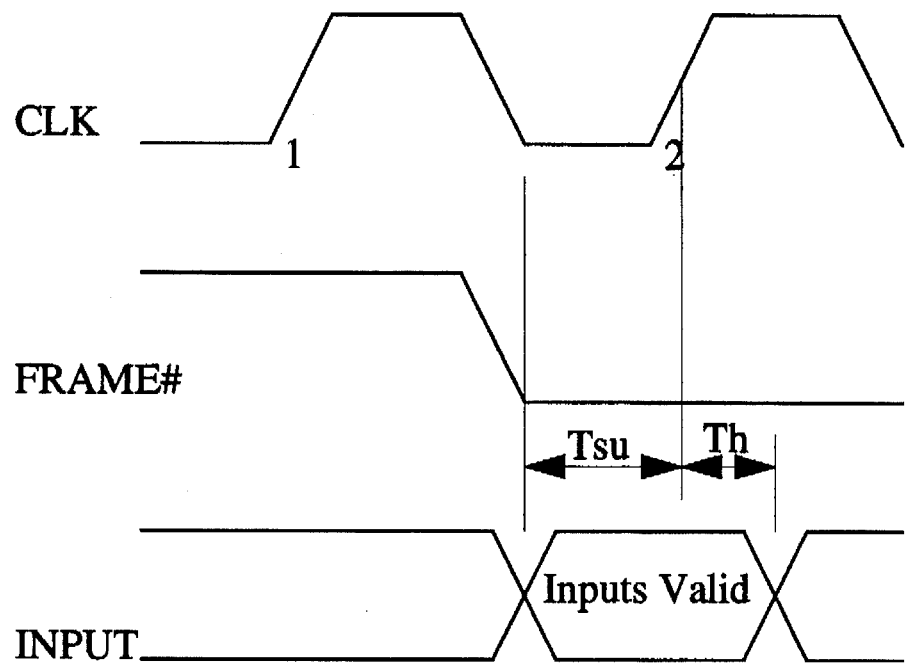
FIG. 2 is a timing diagram illustrating the set-up time, $t_{su}$, and holding time, $t_h$, associated with a PCI bus transaction.
Figure 3:
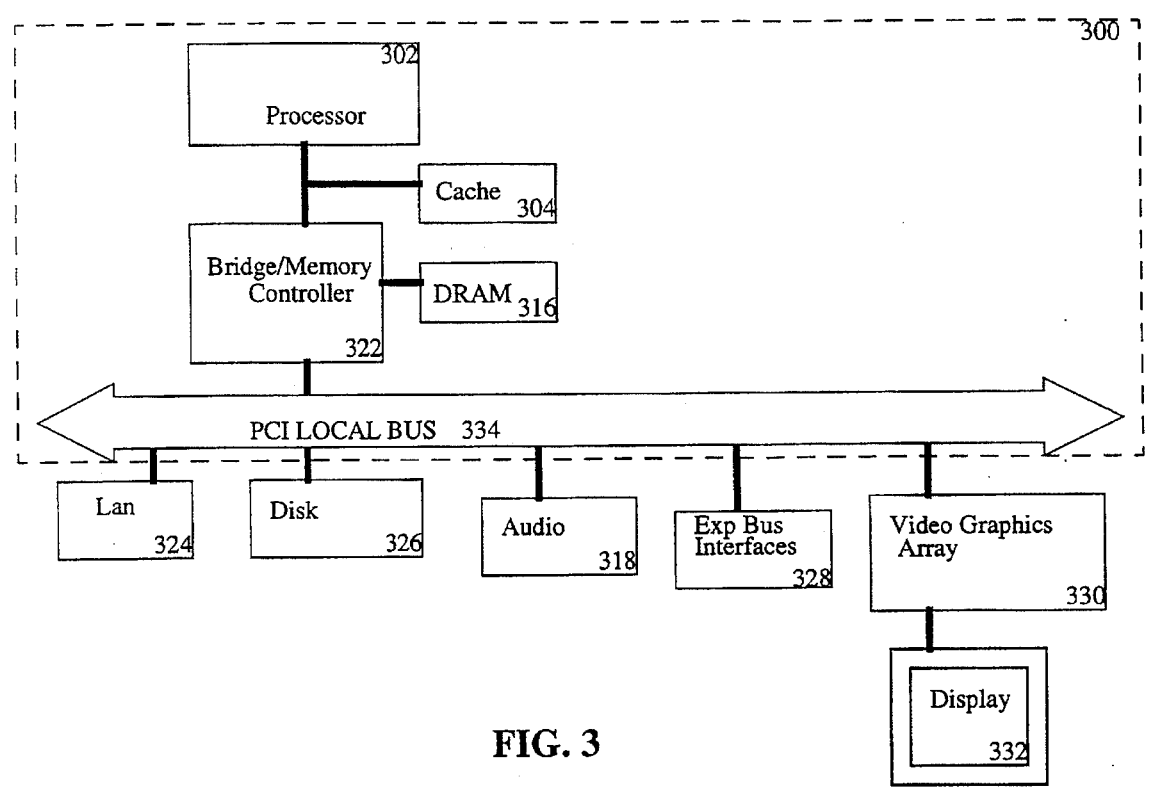
FIG. 3 is a block diagram of a computer system utilizing aspects of the present invention.

FIG. 3 is a block diagram of computer system 300 utilizing aspects of the present invention. Computer system 300 comprises a host processor system chip set which includes host processor 302, cache memory 304, bridge/memory controller 322, and dynamic random access memory 316. Host processor 302 may be any one of a number of commercially available microprocessors such as those marketed by Intel® (Santa Clara, Calif.) and Motorola® (Schaumburg, Ill.). PCI bus 334 couples bridge-memory controller 322 to a number of external devices such as local area network controller 324, hard disk controller 326, audio controller 318, video graphics array 330, and other expansion bus interfaces 328. Video graphics array 330 may drive display device 332 such as a monitor or a liquid crystal display device.

Bridge/memory controller 322 is used to directly access any external device coupled to PCI bus 334. Generally, such external devices are mapped in memory or I/O address spaces. Bridge/memory controller 322 also performs data buffering/posting and PCI bus central functions (e.g., arbitration). While bridge/memory controller 322 may be considered as a PCI bus master, any of the external devices coupled to PCI bus 334 may also act as a bus master.

Although the present invention is practiced in a PCI bus environment, it is to be understood that the invention is applicable to any type of synchronous system bus with appropriate protocols. Furthermore, while the present invention has applicability in peripheral hardware controllers such as disk controllers, audio controllers, LAN controllers, and the like, the best mode for practicing the invention is as part of a video graphics array. The present invention is implemented as part of the CL-GD5434 Graphics User Interface Accelerator. The CL-GD5434 is manufactured and marketed by Cirrus Logic, Inc. of Fremont, Calif.

Figure 4:
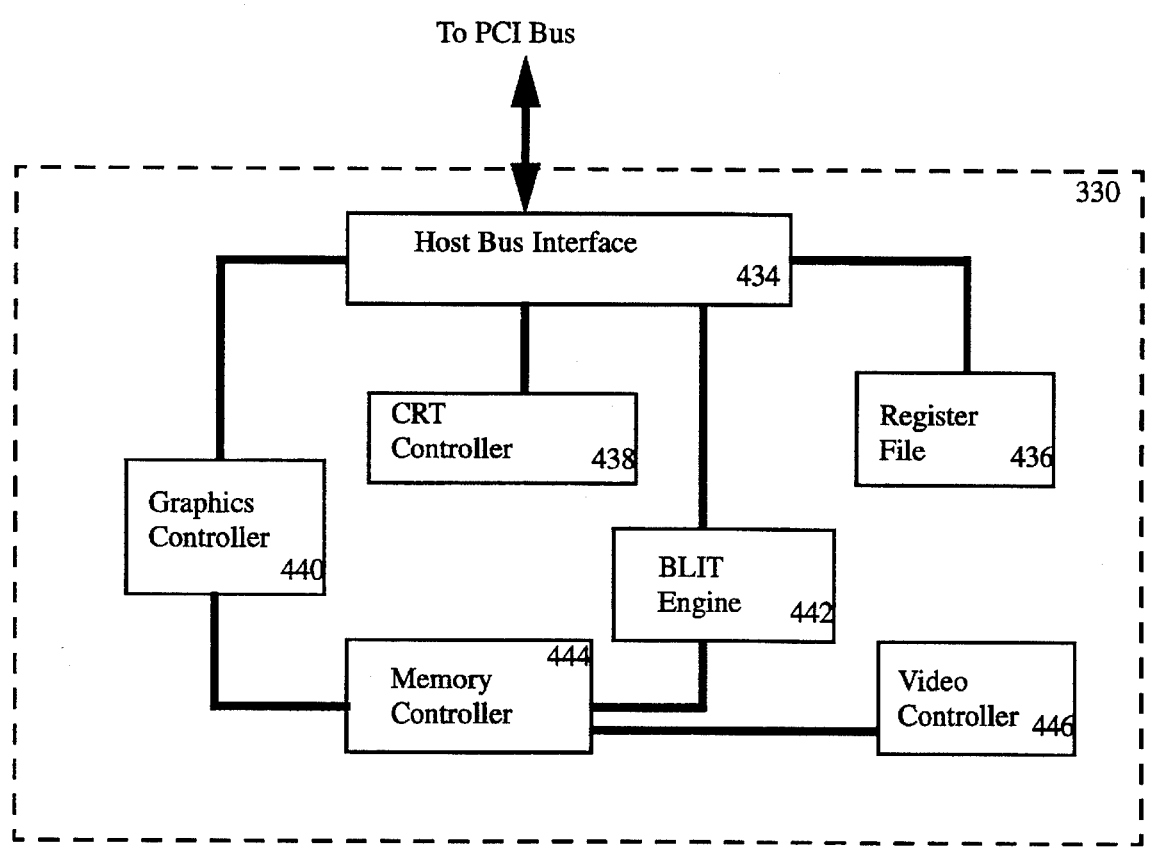
FIG. 4 is a block diagram of a video graphics controller implementing the present invention.

FIG. 4 is an overall block diagram of video graphics array 330. Host bus interface 434 connects video graphics array 330 to PCI bus 334. In addition to performing address decoding to access I/O devices and memory locations, host bus interface responds to applicable CPU commands and controls. The present invention resides inside host bus interface 434. Memory controller 444 is connected to graphics controller 440, BitBLT engine 442, and video controller 445. Memory controller 444 generates the timing signals (e.g., RAS, CAS) for the system display memory (not shown). In addition, memory controller 444 arbitrates over functions that compete for the limited bandwidth of display memory such as CPU access, screen refresh, dynamic-random-access-memory (DRAM) refresh, and BitBLT. Graphics controller 440 is connected between host bus interface 434 and memory controller 444 to perform text manipulation, data rotation, color mapping, and other operations. BitBLT engine 442 is connected to memory controller 444 and host bus interface 434. BitBLT engine 442 is designed to move data in packed-pixel modes with raster operations (ROP).

CRT controller 438 is connected to host bus interface 434. CRT controller 438 generates the HSYNC, VSYNC, and BLANK signal. Register file 436 is connected to host bus interface 434 and stores data for different modes of display resolution such as 320×200 pixels or 640×480 pixels. Video controller 446 is connected to memory controller 444 to format data being transmitted to display device 332. Some of the screen display attributes controlled by video controller 446 include display color selection, text and cursor blinking, and underlining.

Figure 5:
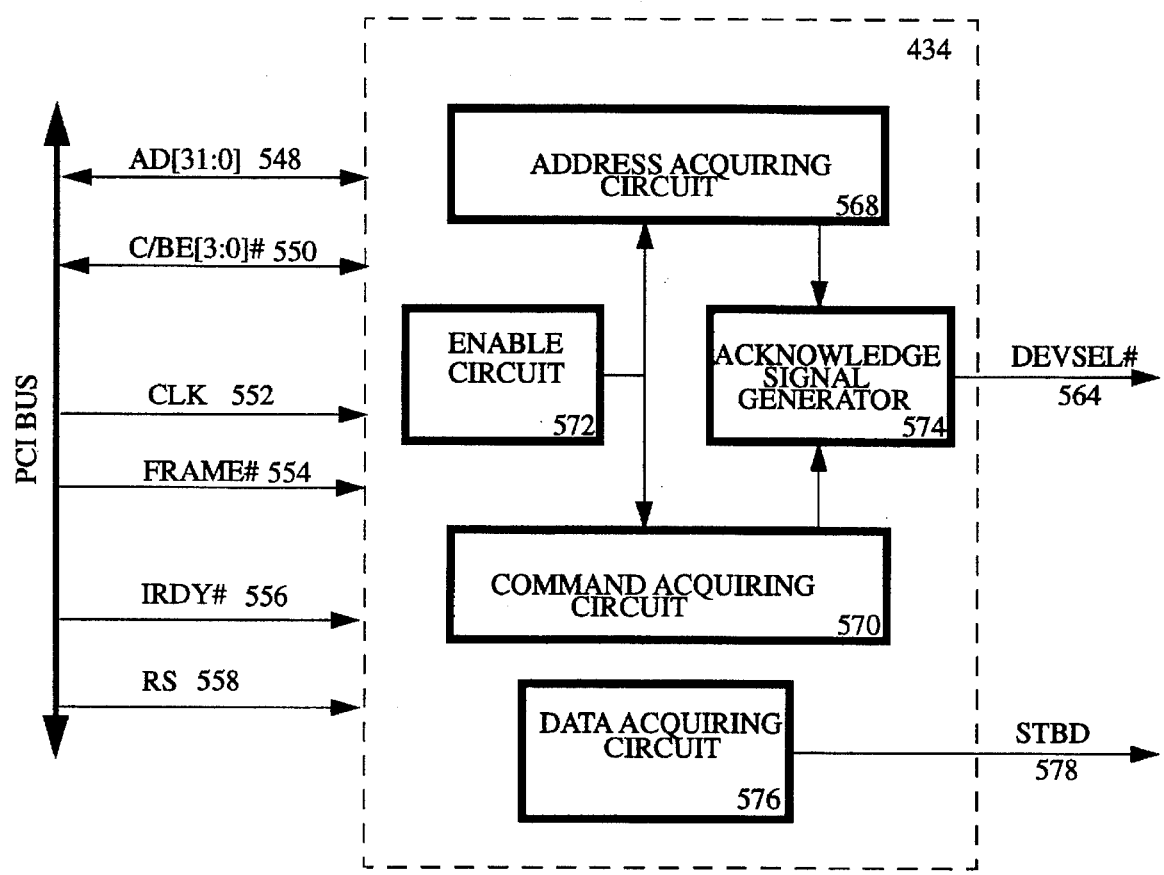
FIG. 5 is an overall block diagram of the host interface of the PCI bus target device shown in FIG. 4.

Referring now to FIG. 5 which is a block diagram of host bus interface 434 comprising address acquiring circuit 568, command acquiring circuit 570, enable circuit 572, acknowledge signal generator 574, and data acquiring circuit 576. Host bus interface 434 receives as inputs combined address & data signals AD 548, bus command & byte enables signal C/BE# 550, system clock signal CLK 552, bus transaction indicator signal FRAME# 554, reset signal RS 558, and initiator ready signal IRDY# 556. Host bus interface 434 outputs acknowledge signal DEVSEL# 564 and acquired data signal STBD[31:0] 578.

Data acquiring circuit is not within the scope of the present invention and is briefly mentioned here for reference purpose. Data acquiring circuit is discussed in detail as part of concurrently filed patent application "Method and Apparatus for Acquiring Bus Transaction Data Information with No More Than Zero-Hold Time", Yip et al., which is incorporated herein by reference. The following description is limited to address acquiring circuit 568, command acquiring circuit 570, enable circuit 572, and acknowledge signal generator 574 which together incorporate aspects of the present invention.

Figure 6:
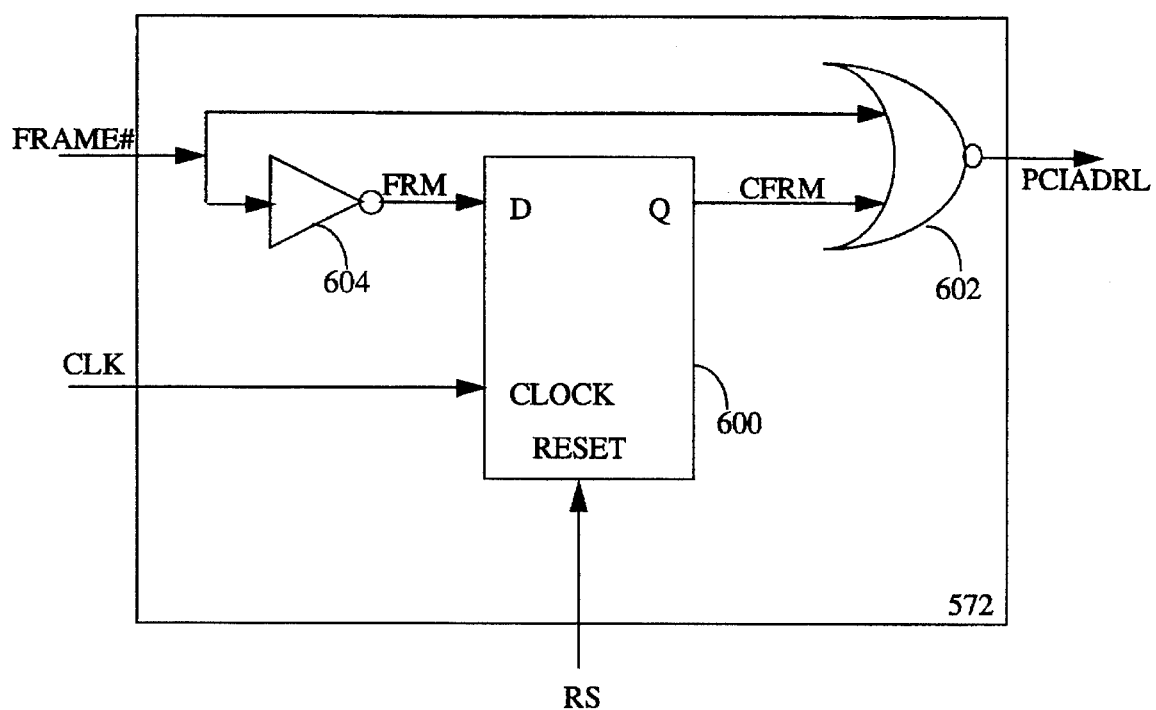
FIG. 6 is the enable circuit of the host interface shown in FIG. 5.

FIG. 6 is a block diagram illustrating details of enable circuit 572. Enable circuit 572 comprises a D-type flip-flop 600, NOR-gate 602, and inverter 604. The D-type flip-flop consists of a D input, a clock input clock, a reset input reset, and an output Q. As shown in FIG. 6, bus transaction signal FRAME# is provided as an input to inverter 604 and NOR-gate 602. In turn, inverter 604 provides its output signal FRM to the input D of flip-flop 600. The reset input of flip-flop 600 is connected to the system reset signal RS. Preferably, output signal CFRM of flip-flop 600 is reset to a logic level '0' by reset signal RS. System clock signal CLK is supplied to the input clock of flip-flop 600 such that for each new clock input, input signal FRM is allowed through to become the new output signal CFRM. Signal CFRM is provided as the other input to NOR-gate 602 which, in turn, supplies signal PCIADRL at its output.

Figure 7:
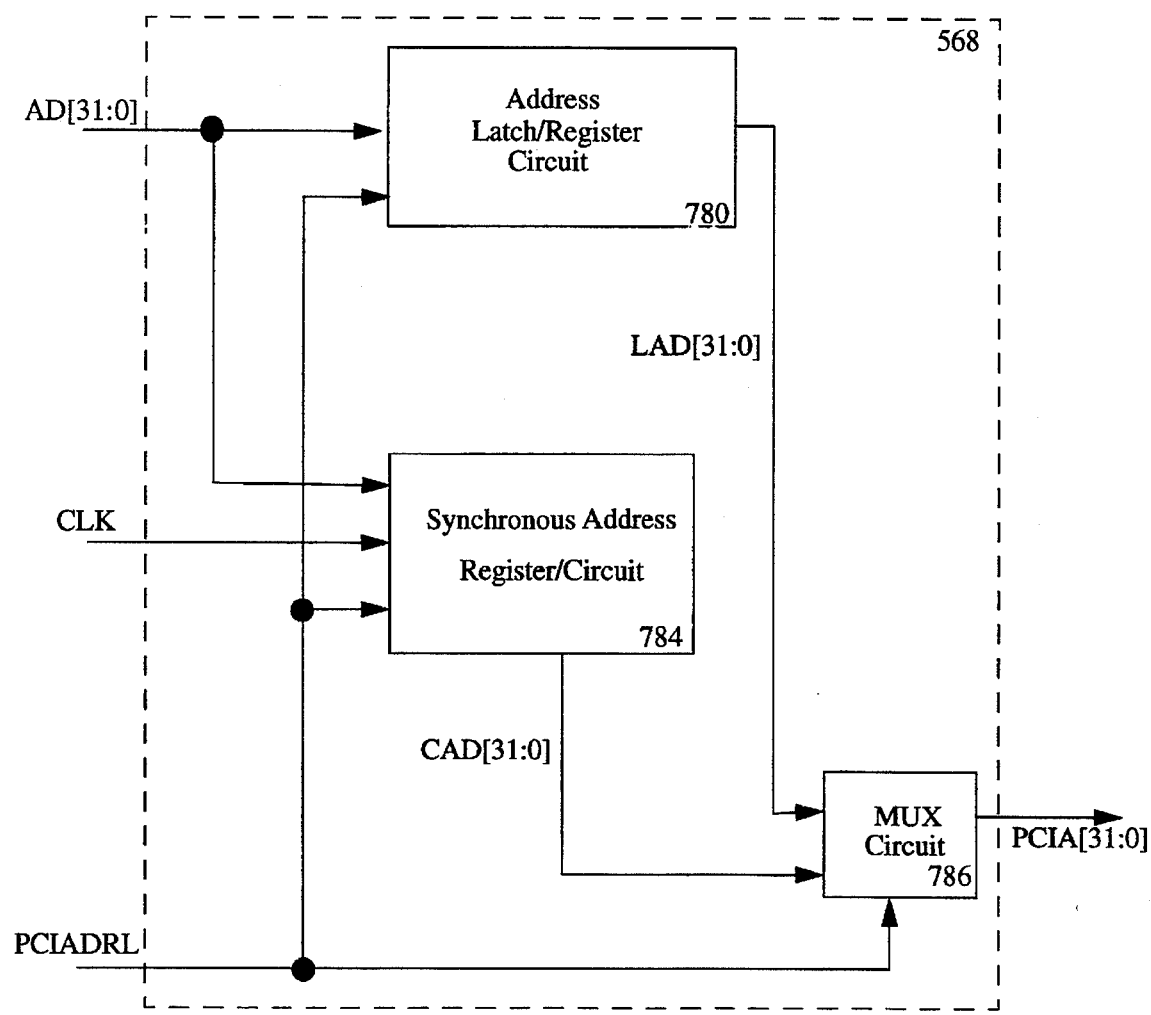
FIG. 7 is a block diagram of the address acquiring circuit shown in FIG. 5.

FIG. 7 provides is a block diagram illustrating details of address acquiring circuit 568. For synchronization purpose, system clock signal CLK 552 is provided as an input to synchronous flip-flop/register circuit 784. Request signal PCIADRL from enable circuit 572 is provided as an input to address latch circuit 780, address synchronous flip-flop/register circuit 784, and address multiplexer 786. Address & data signals AD 548 are also provided as inputs to address latch/register circuit 780 and address synchronous flip-flop/register circuit 784. When request signal PCIADRL is asserted, address latch/register circuit 780 outputs address signal LAD which is provided as input to multiplexer circuit 786. Similarly, when request signal PCIADRL is asserted synchronously with system clock signal CLK, address synchronous flip-flop circuit 784 outputs address signal CAD which is provided as another input to multiplexer circuit 786. Request signal PCIADRL, in turn, triggers multiplexer circuit 786 to provide as its output signal PCIA[31:0] which is the address of the bus target device selected from its inputs. Signal PCIA[31:0] is provided as an input to device select decoder circuit 574.

Figure 8:
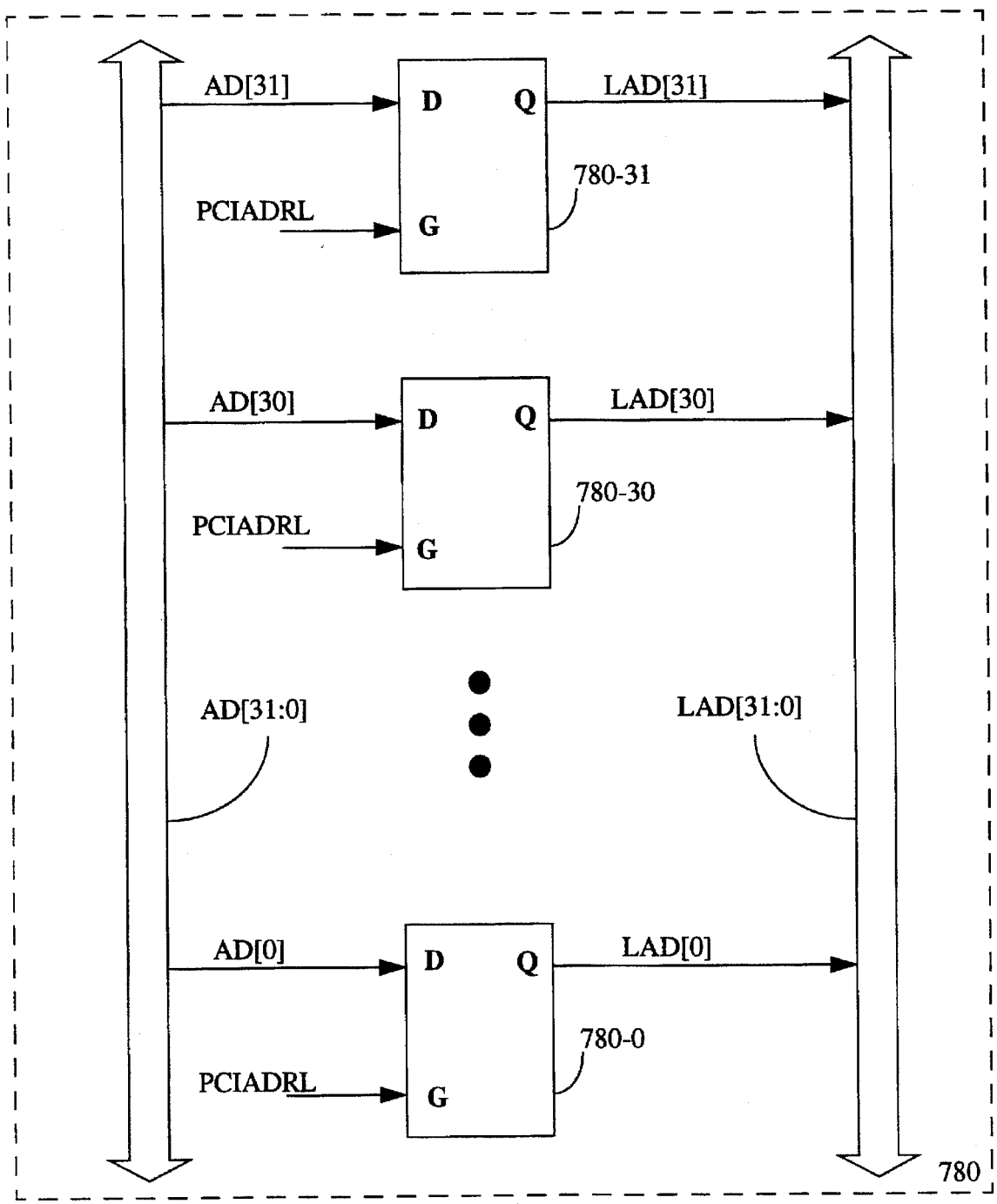
FIG. 8 is a block diagram of the address latch circuit shown in FIG. 7.

Address latch/register circuit 780 is illustrated in more detail in FIG. 8. As will be explained further below, the preferred embodiment of the present invention implements address latch circuit 780 to allow address information from address & data signals AD[31:0] 548 to flow through and become available even before the latches close, allowing the information to be decoded as soon as it is received, thereby generating a fast device acknowledgement signal.

Address latch/register circuit 780 comprises a plurality of latches 780-0 to 780-31, each having a data input D, an enable input G and an output Q. It should be clear to a person of ordinary skill in the art that the number of latches may be varied to accommodate different bus sizes (e.g. 64-bit bus) and the embodiment would still be within the scope of the present invention. Host CPU 12 supplies corresponding bits AD[0] to AD[31] of address & data signals 548 to data inputs D of latches 780-0 to 780-31 respectively via PCI Local Bus. Enable signal PCIADRL is provided as input to the enable inputs G of latches 780-0 to 780-31.

In the preferred embodiment, latches 780-0 to 780-31 are normally closed (i.e., signal PCIADRL is deasserted LOW). When signal PCIADRL is asserted HIGH, latches 780-0 to 780-31 are open to allow bits AD[0] to AD[31] of address & data signals 548 to pass through as output data bits LAD[0] to LAD[31]. For this reason, when latches 780-0 to 780-31 are open, output signals LAD[31:0] represent valid address information from signal AD[31:0] 548. When signal PCIADRL is deasserted LOW to close latches 780-0 to 780-31, bits AD[0] to AD[31] of address & data signals AD[31:0] 548 are acquired as output data bits LAD[0] to LAD[31]. As shown in FIG. 6, logic state changes in signal PCIADRL are triggered by system clock signal CLK following delays associated with NOR-gate 602 and flip-flop 600. For this reason, a delay will always occur between the time of the system clock rising edge and closing of 780-0 to 780-31 to acquire data bits AD[0] to AD[31]. This means that the zero-hold time is not met if only address latch circuit 780 is implemented in the present invention. Additionally, address information provided by signals LAD[31:0] after latches 780-9 to 780-31 are closed may not be valid if address & data signals AD[31:0] change state during or before signal PCIADRL deasserts LOW.

Figure 9:
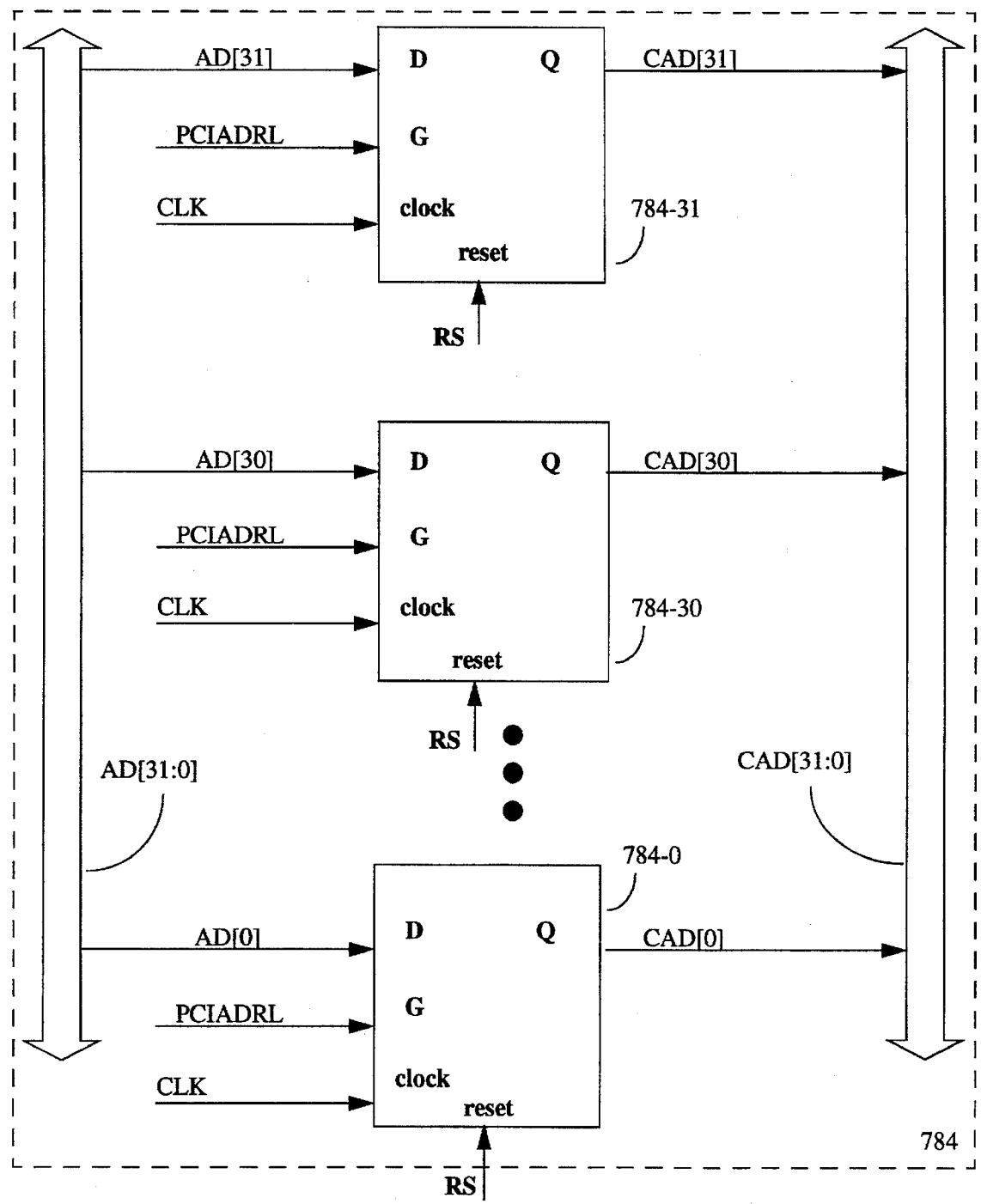
FIG. 9 is a block diagram of the synchronous address circuit shown in FIG. 7.

Synchronous address flip-flop circuit 784 is implemented to assure that data information is captured/acquired with zero-hold time or less and that valid address information from address & data signals AD[31:0] 548 is available over a substantial duration of the bus transaction. Synchronous address flip-flop circuit 784 is illustrated in more detail in FIG. 9. Synchronous address flip-flop circuit 784 comprises a plurality of flip-flops 784-0 to 784-31, each having a data input D, an enable input G, a clock input clock, a reset input R, and an output Q. It should be clear to a person of ordinary skill in the art that the number of flip-flops may be varied to accommodate different bus sizes (e.g. 64-bit bus) and the embodiment would still be within the scope of the present invention.

In the preferred embodiment, host CPU supplies the corresponding bits AD[0] to AD[31] of address & data signals AD[31:0] 548 to data inputs D of flip-flops 784-0 to 784-31. Moreover, enable signal PCIADRL is provided as input to the enable inputs G of flip-flops 780-0 to 780-31. However, system clock signal CLK is provided to the clock input of flip-flops 784-0 to 784-31. In addition, the reset inputs of flip-flops 784-0 to 784-31 are connected to the system reset signal RS. When signal PCIADRL is deasserted, flip-flops 784-0 to 784-31 retain AD[31:0] information captured during a previous clock cycle. Then, when signal PCIADRL is asserted, flip-flops 784-0 to 784-31 are enabled to pass the information received at its inputs D during the previous clock cycle to its outputs Q at the rising clock edge of the current clock cycle. In other words, information received at inputs D of flip-flops 784-0 to 784-31 during clock cycle t1 will be sent to the outputs Q at the beginning of clock cycle t2 as signals CAD[31:0], where t1 and t2 are adjacent clock periods with t1 preceding t2. Because information received during a previous clock cycle (i.e., before time t1) could be information from another bus transaction, the information at outputs Q during clock cycle t1 may not be valid.

Figure 10:
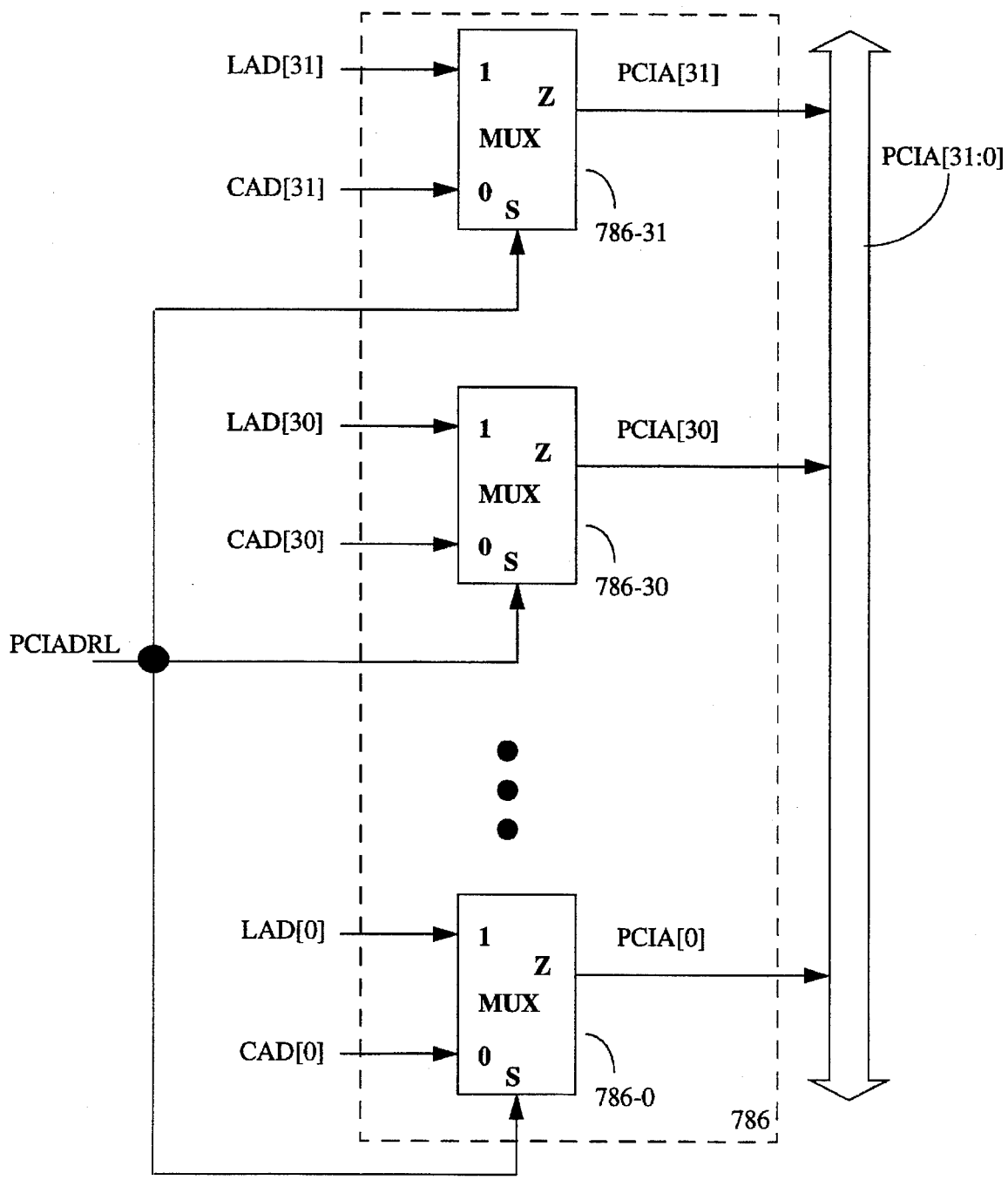
FIG. 10 is a block diagram of the address multiplexer circuit shown in FIG. 7.

Multiplexer circuit 786 is illustrated in more detail in FIG. 10. Because address & data signals CAD[31:0] and LAD [31:0] are alternately valid at different clock cycles, multiplexer circuit 786 is designed to allow address acquiring circuit 568 to switch between signals LAD[31:0] or signals CAD[31:0] to ensure that information received are valid over the substantial duration of the transaction. Multiplexer circuit 786 comprises a plurality of two-to-one multiplexer, 786-0 to 786-31, each having a one-input 1, a zero-input 0, a select input S, and an output Z. Address latch circuit 780 supplies the corresponding bits LAD[0] to LAD[31] of signals LAD[31:0] to one-inputs 1 of multiplexer 786-0 to 786-31. Similarly, synchronous address flip-flop circuit 784 supplies the corresponding bits CAD[0] to CAD[31] of signals CAD[31:0] to zero-inputs 0 of multiplexer 786-0 to 786-31. Enable signal PCIADRL output from enable circuit 572 is supplied to the select input S of each multiplexer 786-0 to 786-31. Depending on the logic state of the signal PCIADRL, either signals LAD[31:0] or CAD[31:0] are provided at output PCIA[31:0] of multiplexer circuit 786. As such, output PCIA [31:0] represent acquired address data signals. Multiplexer 786-0 to 786-31 allow address & data signal LAD[31:0] to pass through as output PCAD[31:0] when select signal PCIADRL is HIGH. Conversely, multiplexers 786-0 to 786-31 allow address & data signal CAD [31:0] to pass through as output PCAD[31:0] when select signal PCIADRL is LOW. Switching between signals LAD [31:0] and CAD[31:0] allows the acquired address & data signal PCAD[31:0] for the target to be valid for substantially the entire duration of the bus transaction.

Figure 11:
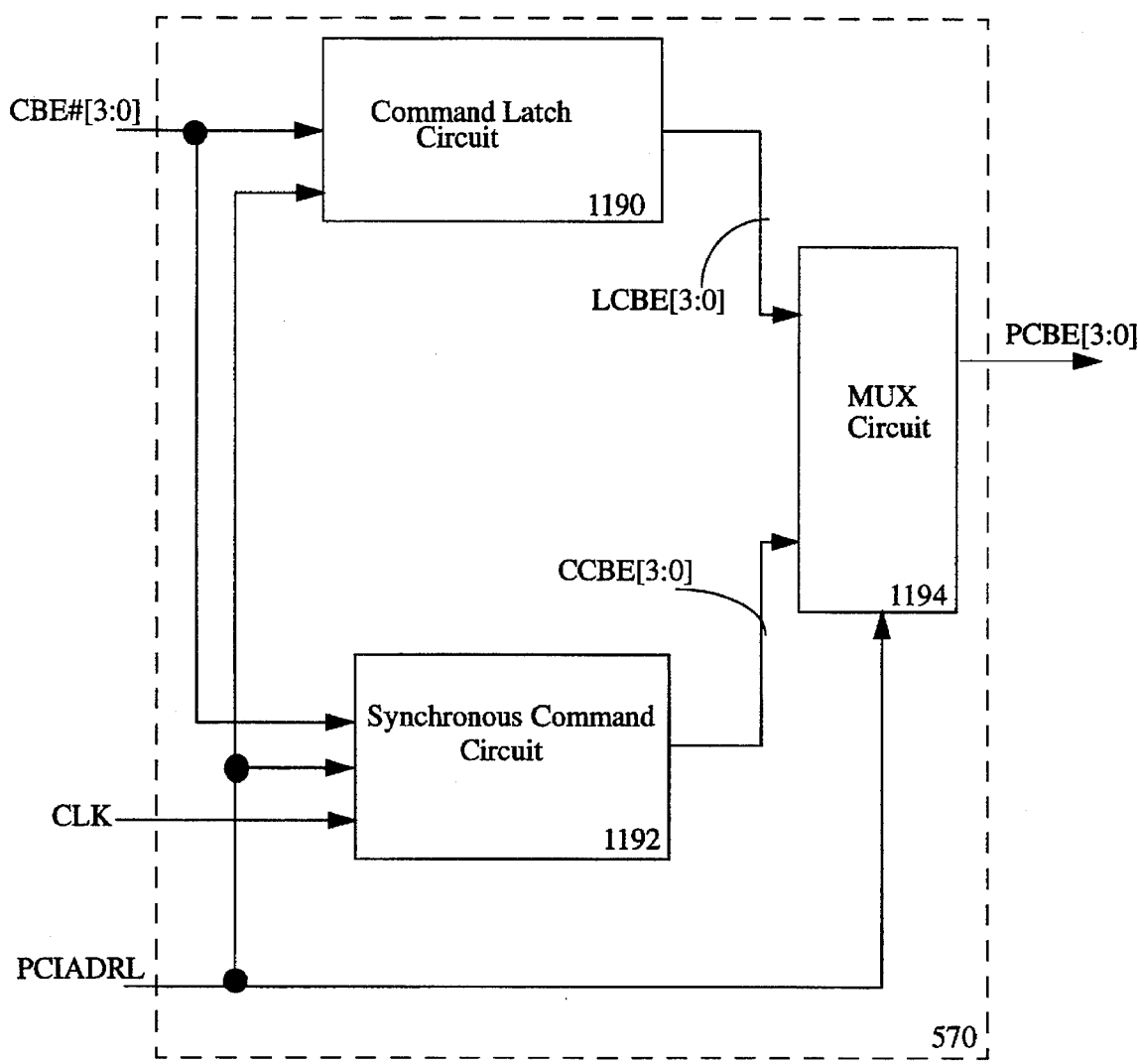
FIG. 11 is a block diagram of the command acquiring circuit shown in FIG. 11.
Figure 12:
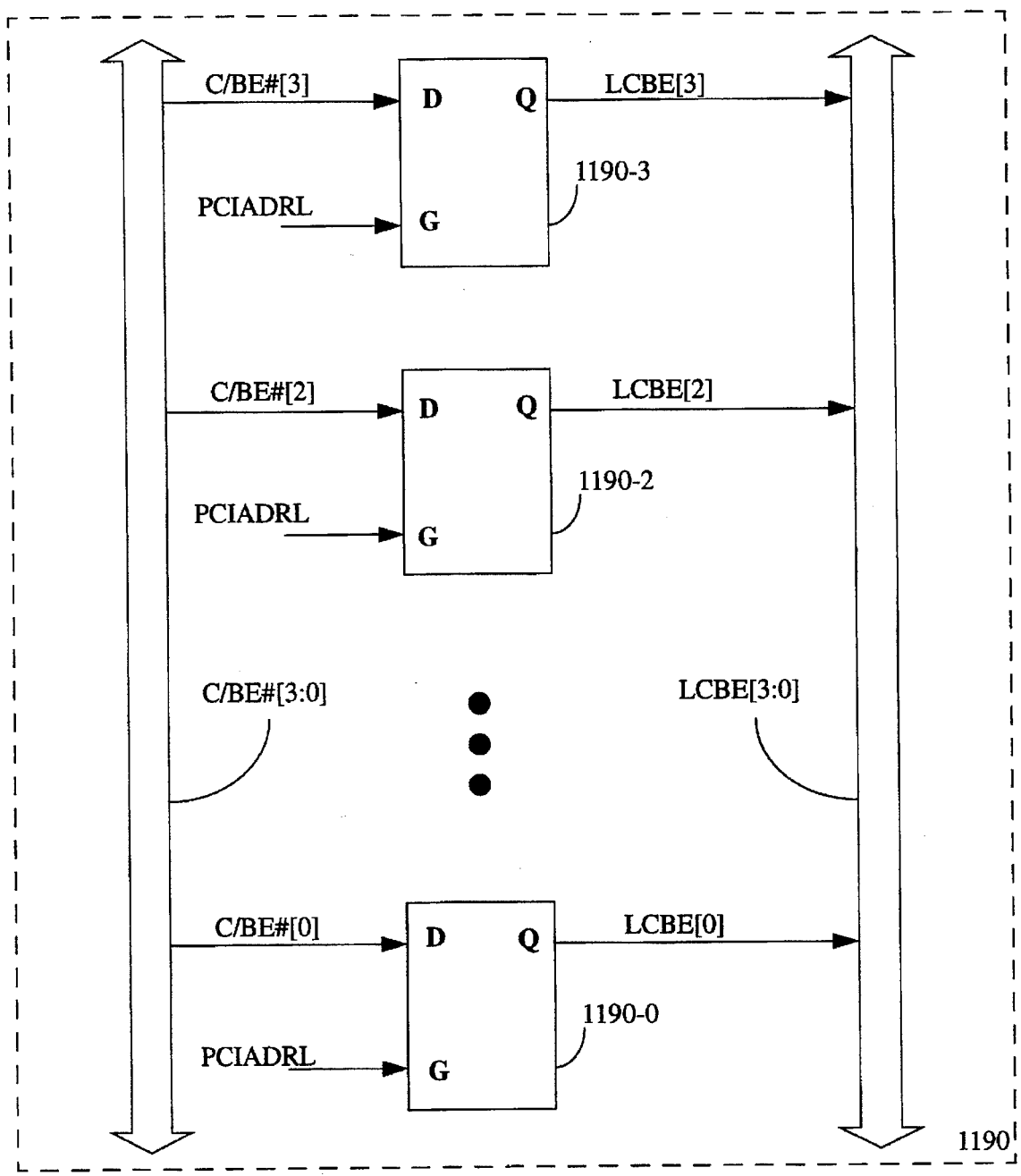
FIG. 12 is a block diagram of the command latch circuit shown in FIG. 11.
Figure 13:
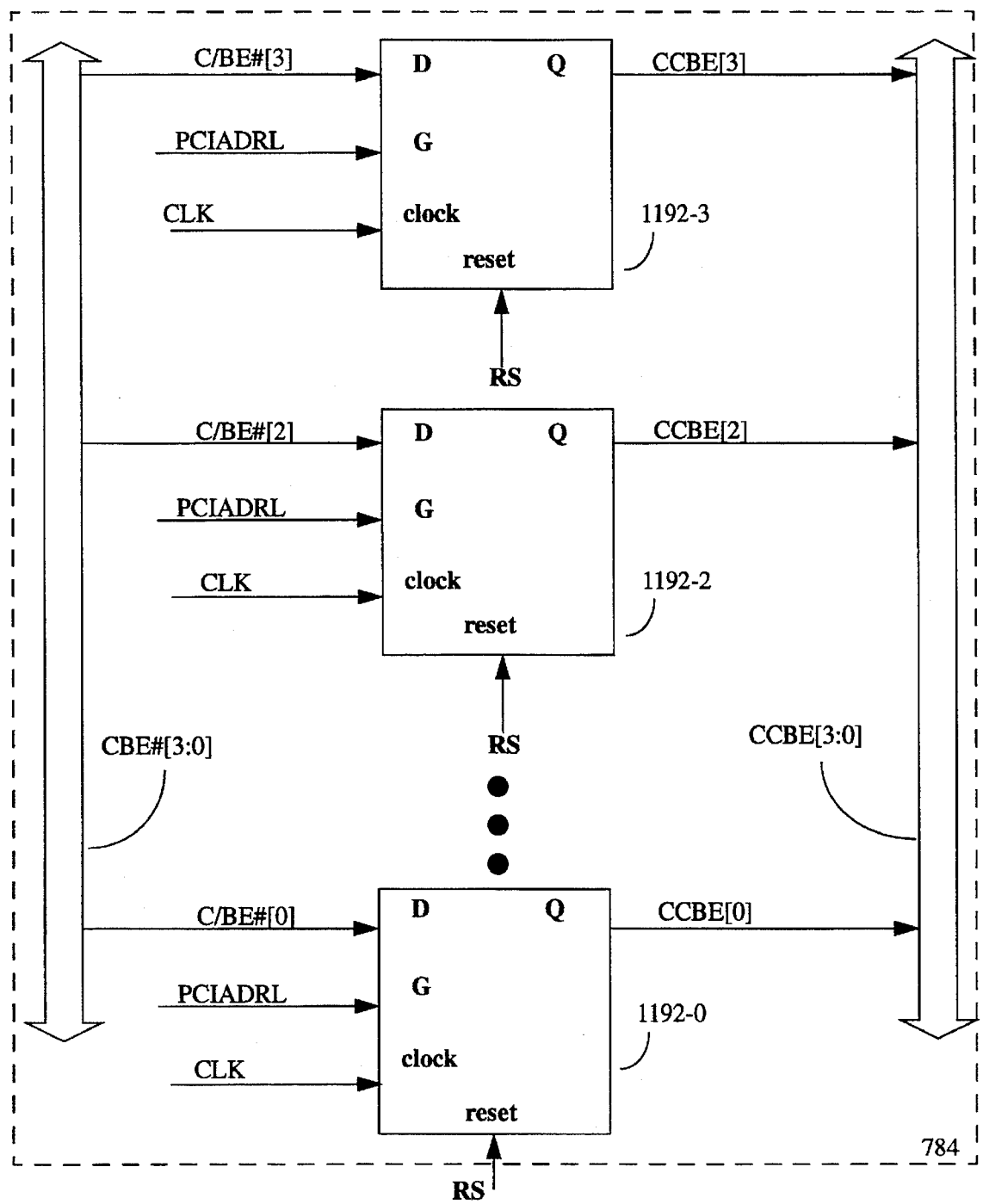
FIG. 13 is a block diagram of the synchronous command circuit shown in FIG. 11.
Figure 14:
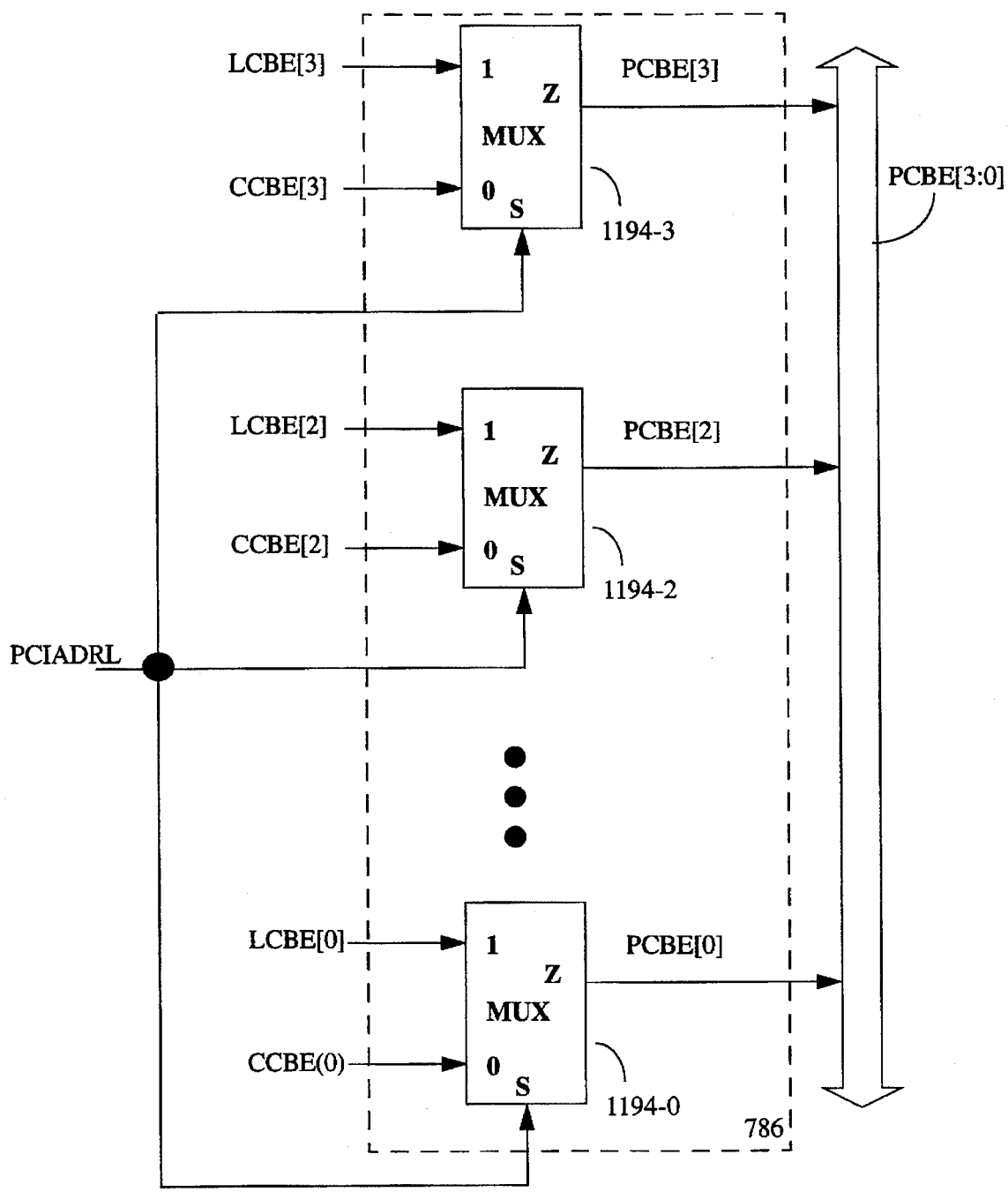
FIG. 14 is a block diagram of the command multiplexer circuit shown in FIG. 11.
Figure 15:
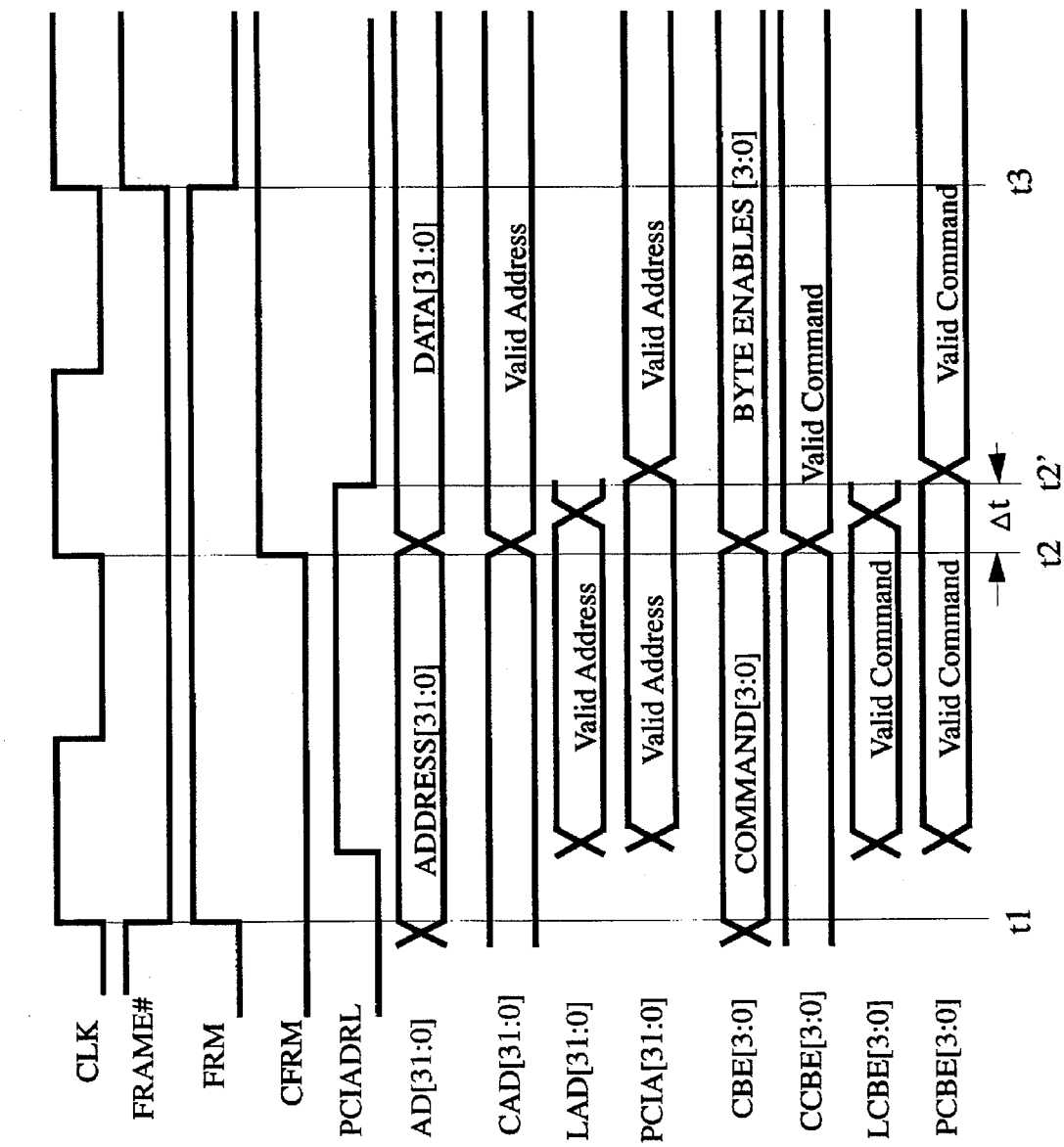
FIG. 15 is a timing diagram for the address and command acquiring circuit shown in FIGS. 7 and 11.

Reference is now made to FIG. 11 which is a block diagram illustrating command acquiring circuit 570. Command acquiring circuit 570 comprises command latch circuit 1190, synchronous command circuit 1192, and command multiplexer circuit 1194. As shown, the block diagram of command acquire module 570 is similar to the block diagram of address acquire module 568. FIGS. 13–15 illustrated in details command latch circuit 1190, command synchronous circuit 1192, and command multiplexer circuit 1194, respectively. By comparing FIGS. 12–14 with FIGS. 7–10, it is clear that except for having command & byte enable signals C/BE[3:0] instead of address & data signal AD[31:0] 548, the detailed diagrams for command latch circuit 1190, command synchronous circuit 1192, and command multiplexer circuit 1194 are the same as the detailed diagrams for address latch circuit 780, address synchronous circuit 784, and address multiplexer circuit 786. Because command latch circuit 1190, command synchronous circuit 1192, and command multiplexer circuit 1194 function similarly to their counterparts address latch circuit 780, address synchronous circuit 784, and address multiplexer circuit 786, respectively, detailed discussions of FIGS. 12–14 are omitted for the sake of brevity and clarity.

To illustrate sequential logical states of address acquiring circuit 568 and command acquiring circuit 570, refer now to FIG. 15 which shows, as examples, timing diagrams for address acquiring circuit 568 and command acquiring circuit 570. In the preferred embodiment, all bus transactional activities are synchronous to system clock signal CLK. Bus transaction signal FRAME# indicating the start of a bus transaction, is activated LOW on a rising edge of clock signal CLK at time t1. Signal FRM, the output of the inverter 884, is the inverse of bus transaction signal FRAME#. Referring back to FIG. 6, when flip-flop 600 is reset at time t1, output signal CFRM of flip-flop 600 preferably attains a LOW logic level. Because input signals FRAME# and CFRM of NOR-gate 602 are both LOW, output signal PCIADRL of NOR-gate 602 becomes HIGH after a delay period. At time t2, output signal CFRM attains the HIGH logic state of input signal FRM. Because bus transaction signal FRAME# is LOW and signal CFRM is HIGH at time t2, signal PCIADRL becomes LOW following a delay period Δt (at time t2'). Delay period Δt is due to the time required for signal FRM to propagate through flip-flop 600 and then for signals FRAME# and CFRM to propagate through NOR-gate 602.

Delay period Δt presents a challenge in meeting the zero-hold time requirement as information is not acquired until signal PCIADRL is deasserted LOW to close latches 780-0 to 780-31. Synchronous address flip-flops 784-0 to 784-31 of address synchronous flip-flop circuit 784 are designed to overcome this challenge. Synchronous address flip-flops 784-0 to 784-31 of address synchronous flip-flop circuit 784 use input signal PCIADRL as an enable signal. Rather, synchronous address flip-flop circuit 684 uses system clock signal CLK as a triggering device to capture address & data signals CAD[31:0]. As such, address & data signals AD[31:0] are captured at a rising clock edge of time t2 and not at time t2'. Since synchronous address flip-flop circuit 784 captures address & data signals AD[31:0] at time t2 (i.e., right at the start of the next clock cycle), the zero-hold time requirement is met. Because synchronous address flip-flop circuit 784 can only captures valid bus transaction address information at time t2, address decoding only starts thereafter and the earliest device select and acknowledgement signals can be generated at time t3. Therefore, address latch circuit 780 may capture valid address information prior to time t2.

When signal PCIADRL is asserted HIGH beginning at time t1, address & data signals LAD[31:0] representing the address portion of signals AD[31:0] are valid at least 7 nano-seconds before time t2. Then, when signal PCIADRL is deasserted LOW beginning at time t2 thereby closing latches 780-0 to 780-31 following delay Δt, address & data signals LAD[31:0] representing the address portion of signals AD[31:0] may become invalid due to a change in signals AD[31:0]. Address & data signals CAD[31:0] representing the address portion of signals AD[31:0] may be invalid during clock cycle t1 because it may be information related to a different bus transaction that synchronous address flip-flop circuit 784 has not updated since PCIADRL signal has not been asserted HIGH until after a rising clock edge occurs at time t1. Signals CAD[31:0], however, become valid at time t2 because address information is updated and retained when signal PCIADRL is asserted HIGH and a rising clock edge occurs at time t2. Thus, valid address portions of signals AD[31:0] 548 are alternately acquired by address latch circuit 780 and synchronous address flip-flop circuit 784 over a substantial duration of the bus transaction.

Furthermore, if an internal delay of address & data signals AD[31:0] in reaching synchronous address flip-flop circuit 784 is more than an internal delay of system clock signal CLK in reaching synchronous address flip-flop circuit 784, then a hold time of address data lines AD[31:0] as input to the synchronous flip-flops 784-0 to 784-31 may be less than the required zero nano-seconds hold-time. While the term "internal" refers to being inside video graphics array 330, the term "external" refers to being outside video graphics array 330.

Similarly, while command latch circuit 1190 utilizes signal PCIADRL to capture command & byte enable signals C/BE[3:0], synchronous command flip-flop circuit 1192 utilizes system clock signal CLK to capture command & byte enable signals C/BE[3:0]. As such, synchronous command flip-flop circuit 1192 acquires the command portion of command & byte enable signals C/BE[3:0] at the rising clock edge of time t2 and therefore satisfies the zero-hold time requirement in a similar fashion to synchronous address flip-flop circuit 784. Moreover, in a similar fashion to address latch circuit 780 and synchronous address flip-flop circuit 784, the command portion of command & byte enable signals C/BE[3:0] are alternately acquired by command latch circuit 1190, as signals LCBE[3:0], and synchronous command flip-flop circuit 1192, as signal CCBE[3:0], over a substantial duration of the bus transaction.

Figure 16:
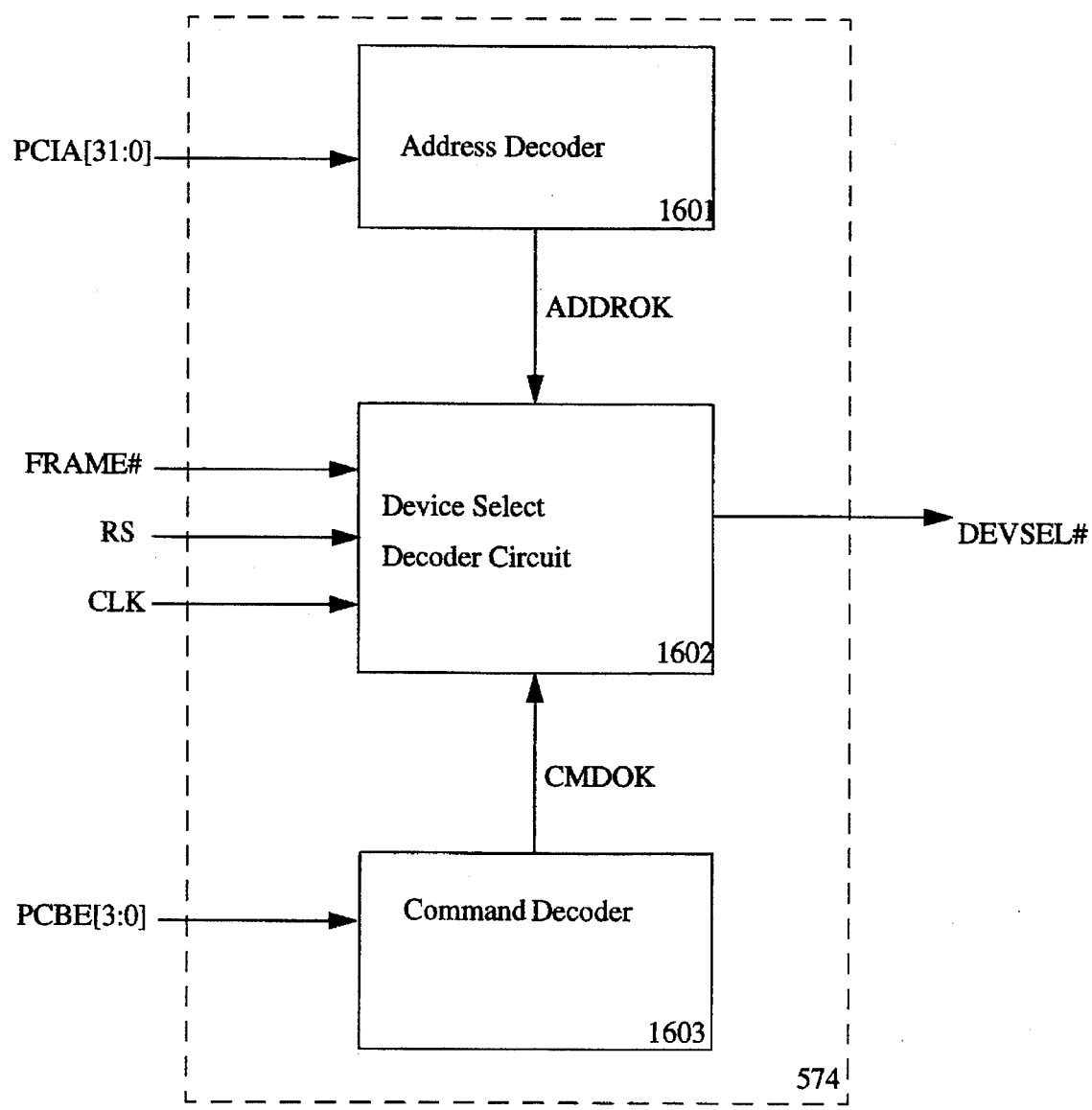
FIG. 16 is a block diagram of the acknowledge signal generator shown in FIG. 5.

Referring now to FIG. 16 which is a block diagram illustrating acknowledge signal generator 574. Acknowledge signal generator 574 comprises address decoder 1601, device select decoder circuit 1602, and command decoder 1603. Address decoder 1601 receives as its inputs signals PCIA[31:0] from address acquiring circuit 568. Address decoder 1601 then generates output signal ADDROK to signify whether address information on address & data signals PCIA[31:0] contains a valid bus target device address. Similarly, command decoder 1603 receives as its inputs signals PCBE[3:0] from command acquiring circuit 570. Command decoder 1603 then generates output signal CMDOK to signify whether the command information on command & byte enable signals PCBE[3:0] contains a valid command. In addition to receiving signals ADDROK and CMDOK as inputs, device select decoder circuit 1602 also receives bus transaction signal FRAME#, system clock signal CLK, and system reset signal RS. Address decoder 1601 and command decoder 1603 are not described further because they are well-known technology.

Figure 17:
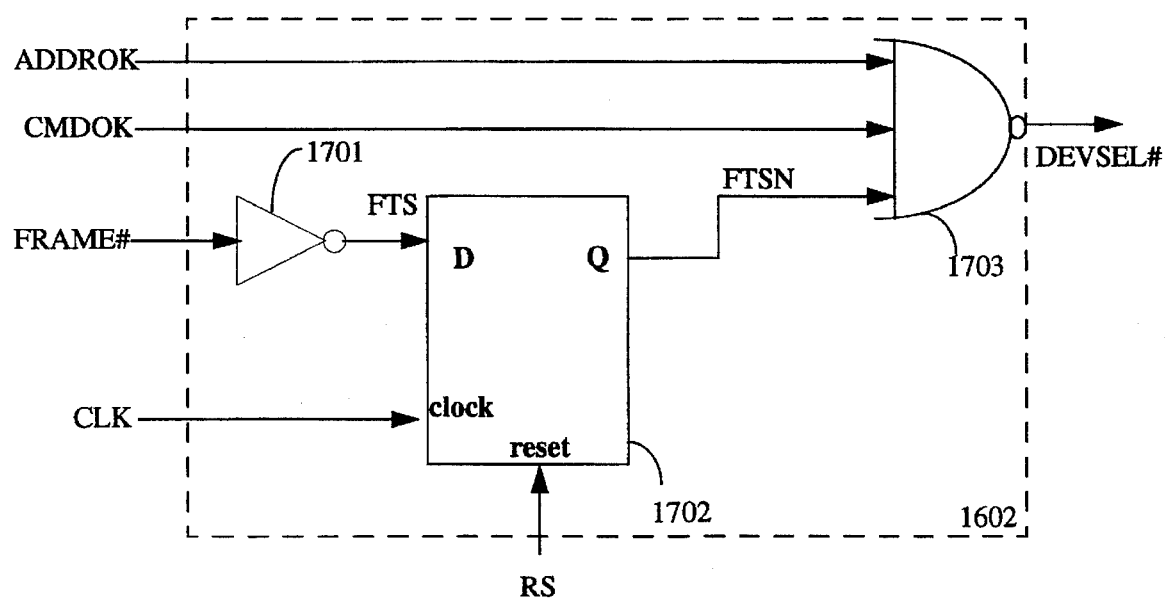
FIG. 17 is a logic diagram of the device select decoder circuit shown in FIG. 16.

Device select decoder circuit 1602 is described in more detail in FIG. 17. Device select decoder circuit 1602 comprises inverter 1701, D-type flip-flop 1702, and NAND-gate 1703. As shown, bus transaction signal FRAME# is provided as input to inverter 1701. Inverter 1701 outputs signal FTS to input D of flip-flop 1702. System clock signal CLK is also fed to input clock of flip-flop 1702 for synchronization purpose. Flip-flop 1702 outputs signal FTSN which is provided together with signals ADDROK and CMDK as inputs to NAND-gate 1703. NAMD-gate 1703 outputs device select signal DEVSEL#. Preferably, system reset signal RS resets output signal FTSN of flip-flop 1702 to a LOW logic state.

Figure 18:
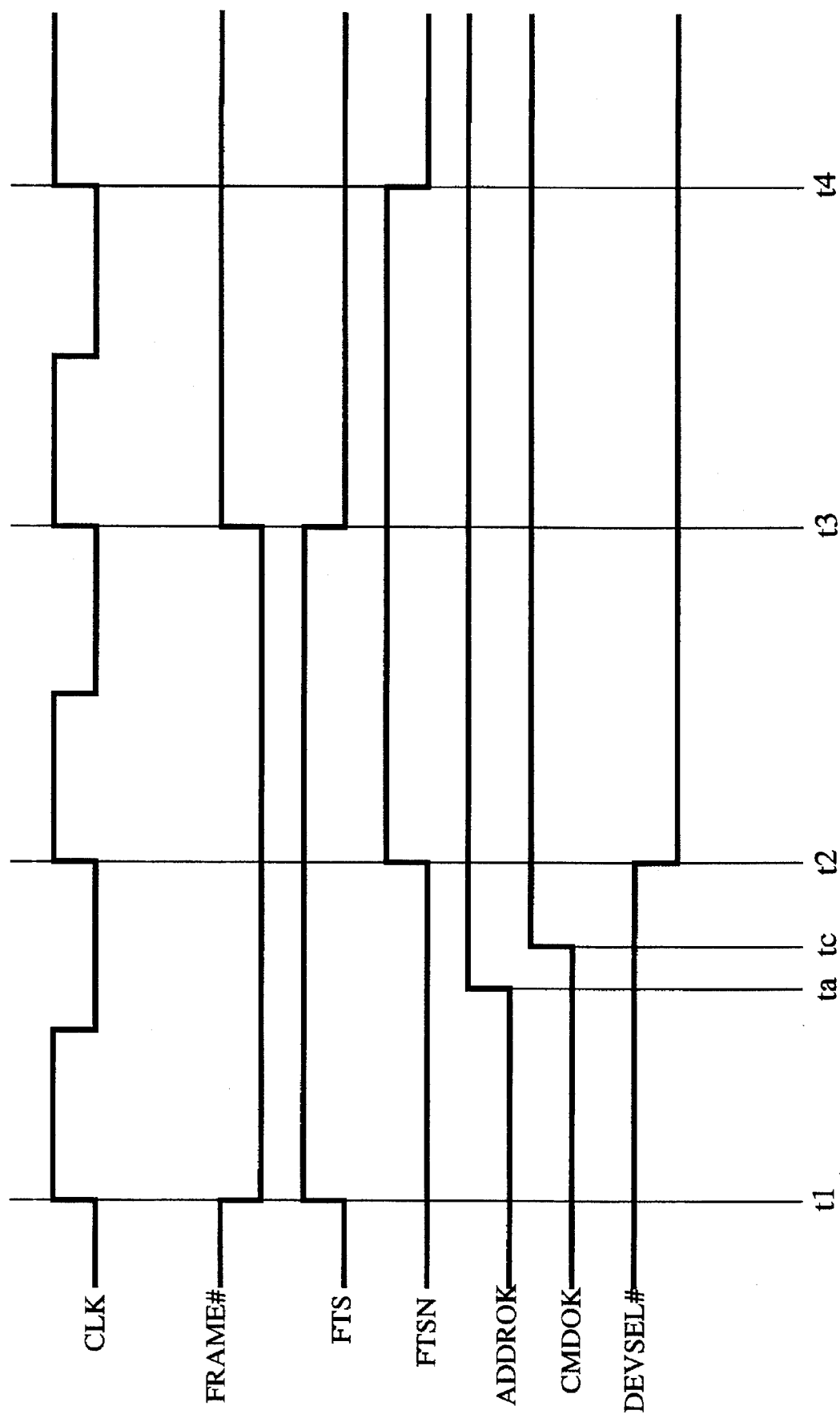
FIG. 18 is a timing diagram associated with the acknowledge signal generator shown in FIG. 16.

FIG. 18 is an example of a timing diagram of device select decoder circuit 1602. Prior to time t1, bus transaction signal FRAME# is deasserted HIGH because a bus transaction has not been initiated by a bus master. As a result, inverter 1701 generates a LOW logic state FTS signal at its output. Prior to time t1, flip-flop 1702 is reset by signal RS causing output signal FTSN to go LOW. As such, regardless of what logic state signals ADDROK and CMDOK are, NAND-gate 1703 generates a HIGH logic state signal DEVSEL#.

At time t1, assuming a bus master initiates a bus transaction, bus transaction FRAME# is then asserted LOW. Inverter 1701 generates a HIGH logic state FTS signal. Because flip-flop 1702 has been reset by system reset signal RS, signal FTSN has a LOW logic state. Between time t1 and time t2, signals ADDROK and CMDOK are asserted HIGH at different times, ta and tc, respectively, to indicate that the target address and command signals received are valid. At time t2, while signal FRAME# remains the same, signal FTSN becomes HIGH because signal FTSN attains the logical state of signal FTS at the previous clock cycle t1. As signal FTSN becomes HIGH, NAND-gate 1703 generates a LOW signal DEVSEL# at time t2 to acknowledge that the target devices has received the bus transaction request. Following the same logic above, when signal FRAME# is deasserted HIGH at time t3, signal FTS becomes LOW which triggers signal FTSN to go LOW at time t4 and consequently signal DEVSEL# be deasserted HIGH at time t5. It is to be appreciated that, with a slight juxtaposition in the logic of NOR 982 to NAND 980, the signal DEVSEL# could be asserted LOW before the clock rising edge at t2. As discussed above, signal DEVSEL# is generated in one clock cycle.

While the preferred embodiment and various alternative embodiments of the invention has been disclosed and described in detail herein, it will be obvious to those skilled in the art that various changes in form and detail may be made therein without departing from the spirit and scope thereof. Moreover, it is to be understood that the detailed description of the present invention above is by way of illustration and example only and is not to be taken by way of limitation, the spirit and scope of the present invention being limited only by the terms of the appended claims.

We claim:

1. An apparatus for acquiring address and command information from a synchronous bus transaction which operates at no more than zero hold-time over a substantial duration of said synchronous bus transaction, comprising:

first signal synchronizing means for generating a synchronous enable signal by synchronizing a bus transaction request signal with a system clock signal;

transparent register means coupled to a system bus and said first signal generating means, said transparent register means being responsive to a predetermined logic state of said synchronous enable signal for immediately making available and acquiring valid address and command information provided by said bus transaction;

synchronous register means coupled to said system bus, said synchronous register means being responsive to a predetermined edge of said system clock signal and said synchronous enable signal for alternately acquiring valid address and command information provided by said bus transaction; and multiplexing means coupled to said transparent register means and said synchronous register means for selecting between acquired valid address and command information from said transparent register means and said alternately acquired valid address and command information from said synchronous register means as an output.

2. The apparatus of claim 1 wherein said first signal synchronizing means comprises:

an inverter receiving said bus transaction request signal as an input signal, said inverter generating an inverted signal of said bus transaction request signal;

a flip-flop receiving said inverted signal of said bus transaction request signal as a first input signal and said system clock signal as a second signal, said flip-flop generating a synchronous output signal; and a NOR-gate receiving said bus transaction request signal as a first input and said synchronous output signal as a second input, said NOR-gate outputing said synchronous enable signal.

3. The apparatus of claim 1 wherein said transparent register means comprises a plurality of latches, each of said latches corresponds to a binary bit of said bus transaction address and command information.

4. The apparatus of claim 3 wherein said enable signal determines whether said latches open or close.

5. The apparatus of claim 1 wherein said predetermined logic state of said synchronous enable signal is a HIGH logic state.

6. The apparatus of claim 1 wherein said synchronous register means comprises a plurality of flip-flops, each of said flip-flops corresponds to a binary bit of said bus transaction address and command information.

7. The apparatus of claim 6 wherein said synchronous enable signal and said predetermined edge of said system clock signal trigger said synchronous register means to alternately acquire valid address and command information provided by said bus transaction.

8. The apparatus of claim 1 wherein said predetermined edge of said system clock signal is a rising edge.

9. The apparatus of claim 1 wherein said multiplexing means comprises a plurality of two-to-one multiplexers, each of said multiplexers corresponds to a binary bit of said bus transaction address and command information.

10. The apparatus of claim 9 wherein said multiplexing mean uses said synchronous enable signal in selecting between acquired valid address and command information from said transparent register means and synchronous register means as said output of said multiplexing means.

11. The apparatus of claim 1 further comprising:

decoding means coupled to said multiplexing means for determining whether said output of said multiplexing means contains valid information, said decoding means generates a status signal; and second signal synchronizing means coupled to said decoding means for receiving said status signal, said second signal synchronizing means generating a bus transaction acknowledgement signal by synchronizing said system clock signal with said bus transaction request signal.

12. The apparatus of claim 11 wherein said second signal synchronizing means comprises:

an inverter receiving said bus transaction request signal as an input, said inverter generating an inverted signal of said bus transaction request signal;

a flip-flop receiving said inverted signal of said bus transaction request signal as a first input and said system clock signal as a second input, said flip-flop generating a synchronous output; and a NAND-gate connected to said decoding means and said synchronous output of said flip-flop, said NAND-gate outputing said bus transaction acknowledgement.

13. A computer system comprising:

a host processor;

a system memory;

a system bus coupling said host processor to said system memory; and a peripheral hardware controller interposed between said system bus and external devices; said peripheral hardware controller having an apparatus for acquiring address and command information from a synchronous bus transaction which operates with no more than zero hold-time over a substantial duration of said synchronous bus transaction, comprising:

first signal synchronizing means for generating a synchronous enable signal by synchronizing a bus transaction request signal with a system clock signal;

transparent register means coupled to a system bus and said first signal generating means, said transparent register means being responsive to a predetermined logic state of said synchronous enable signal for immediately making available and acquiring valid address and command information provided by said bus transaction;

synchronous register means coupled to said system bus, said synchronous register means being responsive to a predetermined edge of said system clock signal and said synchronous enable signal for alternately acquiring valid address and command information provided by said bus transaction; and multiplexing means coupled to said transparent register means and said synchronous register means for selecting between acquired valid address and command information from said transparent register means and said alternately acquired valid address and command information from said synchronous register means as an output.

14. The computer system of claim 13 wherein said first signal synchronizing means comprises:

an inverter receiving said bus transaction request signal for generating an inverted signal of said bus transaction request signal;

a flip-flop receiving said inverted signal of said bus transaction request signal as a first input signal and said system clock signal as a second input signal, said flip-flop generating a synchronous output signal; and a NOR-gate receiving said bus transaction request signal as a first input signal and said synchronous output signal of said flip-flop as a second input signal, said NOR-gate outputing said synchronous enable signal.

15. The computer of claim 13 wherein said transparent register means comprises a plurality of latches, each of said latches corresponds to a binary bit of said bus transaction information.

16. The computer system of claim 13 wherein said synchronous flip-flop means comprises a plurality of flip-flops, each of said flip-flops corresponds to a binary bit of said bus transaction address and command information.

17. The computer of claim 13 wherein said multiplexing means comprises a plurality of two-to-one multiplexers, each of said multiplexers corresponds to a binary bit of said bus transaction information.

18. The computer system of claim 13 wherein said apparatus further comprising:

decoding means coupled to said multiplexing means for determining whether said output of said multiplexing means contains valid information, said decoding means generates a status signal; and second signal synchronizing means coupled to said decoding means for receiving said status signal, said second signal synchronizing means generating a bus transaction acknowledgement signal by synchronizing said system clock signal with said bus transaction request signal.

19. The apparatus of claim 18 wherein said second signal synchronizing means comprises:

an inverter receiving said bus transaction request signal for generating an inverted signal of said bus transaction request signal;

a flip-flop receiving said inverted signal of said bus transaction request signal as a first input signal and said system clock signal as a second input signal, said flip-flop generating a synchronous output signal; and a NAND-gate connected to said decoding means and said synchronous output signal of said flip-flop, said NAND-gate outputing said bus transaction acknowledgement.

20. A method for acquiring address and command information from a synchronous bus transaction which operates with no more than zero hold-time over a substantial duration of said bus transaction, the method comprising:

synchronizing a bus transaction request signal with a system clock signal to generate a synchronous enable signal;

acquiring valid address and command information provided by said bus transaction in response to a predetermined logic state of said synchronous enable signal;

acquiring alternate valid address and command information provided by said bus transaction in response to a predetermined edge of said system clock signal; and selecting between said acquired valid address & command information and said alternately acquired valid address & command information associated with said bus transaction information to provide as an output.

21. The method of claim 20, wherein said step of acquiring alternate valid address and command information further comprising the step of making available said acquired alternate valid address and command information provided by said bus transaction.

22. The method of claim 21, further comprising the steps of:

decoding said output signal to determine whether output signal is valid; and generating said bus transaction acknowledgement signal if said output signal is valid.

* * * * *